(12) United States Patent
Song et al.

(10) Patent No.: US 10,361,035 B1
(45) Date of Patent: Jul. 23, 2019

(54) MULTILAYER CERAMIC ELECTRONIC COMPONENT

(71) Applicant: SAMSUNG ELECTRO-MECHANICS CO., LTD., Suwon-si, Gyeonggi-do (KR)

(72) Inventors: Seung Woo Song, Suwon-si (KR); Jin Man Jung, Suwon-si (KR); Sang Soo Park, Suwon-si (KR); Jin Kyung Joo, Suwon-si (KR); Woo Chul Shin, Suwon-si (KR); Min Gon Lee, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 16/202,051

(22) Filed: Nov. 27, 2018

(30) Foreign Application Priority Data

Oct. 2, 2018 (KR) .......................... 10-2018-017769

(51) Int. Cl.
*B21D 39/00* (2006.01)
*H01G 4/30* (2006.01)
(Continued)

(52) U.S. Cl.
CPC ................ *H01G 4/30* (2013.01); *H01G 4/008* (2013.01); *H01G 4/1227* (2013.01); *Y10T 428/12535* (2015.01)

(58) Field of Classification Search
CPC ............ H01G 4/018; H01G 4/06; H01G 4/08; H01G 4/085; H01G 4/10; H01G 4/105; H01G 4/12; H01G 4/1209; H01G 4/14; H01G 4/145; H01G 4/18; H01G 4/20; H01G 4/206
See application file for complete search history.

(56) References Cited

U.S. PATENT DOCUMENTS 6,171,644 B1 * 1/2001 Jinno ..................... H01C 1/034
29/25.41
7,292,429 B2 * 11/2007 Randall .................. H01G 4/232
361/303
(Continued)

FOREIGN PATENT DOCUMENTS

JP          2012-028457 A    2/2012
JP          2018-129499 A    8/2018
KR    10-2014-0085097 A     7/2014

*Primary Examiner* — Seth Dumbris
(74) *Attorney, Agent, or Firm* — Morgan, Lewis & Bockius, LLP (57) ABSTRACT

A multilayer ceramic electronic component includes a ceramic body including a dielectric layer, and a first internal electrode and a second internal electrode facing each other with the dielectric layer interposed therebetween, and a first external electrode electrically connected to the first internal electrode, and a second external electrode electrically connected to the second internal electrode, disposed on an outer surface of the ceramic body. Each of the first and second external electrodes includes a first electrode layer including a conductive metal and a plating layer disposed on the first electrode layer. The first electrode layer extends beyond the plating layer on the ceramic body, and includes a first area covered by the plating layer, and a second area extending from the first area, and an insulating layer covers the second area.

20 Claims, 4 Drawing Sheets

(51) Int. Cl.
*H01G 4/008* (2006.01)
*H01G 4/12* (2006.01)

(56) References Cited

U.S. PATENT DOCUMENTS

| | | |
|---|---|---|
| 2012/0018204 A1 | 1/2012 | Sato et al. |
| 2014/0085767 A1* | 3/2014 | Kang ..................... H01G 4/12 |
| | | 361/301.4 |
| 2014/0185189 A1 | 7/2014 | Kim et al. |
| 2015/0325369 A1* | 11/2015 | Inoue ..................... H01C 17/02 |
| | | 336/200 |
| 2018/0233287 A1 | 8/2018 | Seo et al. |

* cited by examiner

MULTILAYER CERAMIC ELECTRONIC COMPONENT

CROSS-REFERENCE TO RELATED APPLICATION(S)

This application claims the benefit of priority to Korean Patent Application No. 10-2018-0117769 filed on Oct. 2, 2018 in the Korean Intellectual Property Office, the disclosure of which is incorporated herein by reference in its entirety.

BACKGROUND

1. Field

The present disclosure relates to a multilayer ceramic electronic component and more particularly, to a multilayer ceramic electronic component having improved reliability.

2. Description of Related Art

Recently, a substrate having high mounting density has been developed, and it has become necessary to reduce a mounting area of a multilayer ceramic capacitor. There has been increased demand for products in which a multilayer ceramic capacitor having a low thickness is embedded in a substrate or mounted in a lower end of an application processor as a land-side capacitor.

In this case, not only the mounting area may be decreased, but equivalent series inductance (ESL) occurring in a substrate may also be reduced. For this reason, a multilayer ceramic capacitor having a relatively low thickness has increasingly been used.

In a multilayer ceramic capacitor having a low thickness, a thickness of an external electrode may not be increased further than a certain thickness, within a limited thickness.

Accordingly, moisture resistance reliability may be degraded as a thickness of an external electrode may not be reduced.

Particularly, in the case of a low inductance chip capacitor (LICC), as a gap between external electrodes is significantly reduced, moisture resistance reliability may be further degraded.

Therefore, it may be necessary to improve moisture resistance reliability of a thin-film multilayer ceramic capacitor and an LICC having a thickness of 110 μm or less.

SUMMARY

An aspect of the present disclosure may provide a multilayer ceramic electronic component, and more particularly a multilayer ceramic electronic component having improved reliability.

According to an aspect of the present disclosure, a multilayer ceramic electronic component includes a ceramic body including a dielectric layer, and a first internal electrode and a second internal electrode facing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other, and a first external electrode electrically connected to the first internal electrode, and a second external electrode electrically connected to the second internal electrode, disposed on an outer surface of the ceramic body. Each of the first and second external electrodes includes a first electrode layer including a conductive metal and a plating layer disposed on the first electrode layer. The first electrode layer extends beyond the plating layer on the first surface of the ceramic body, and includes a first area covered by the plating layer, and a second area extending from the first area. An insulating layer covers the second area. $0.40 \leq L/BW \leq 4.00$, where L is a length of the insulating layer on the first surface in a width direction of the ceramic body, and BW is a distance from an outer edge of the first or second external electrode disposed on the first surface to an end of the respective first electrode layer on the first surface in the width direction of the ceramic body.

According to another aspect of the present disclosure, a multilayer ceramic electronic component includes a ceramic body including a dielectric layer, and a first internal electrode and a second internal electrode facing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other, and a first external electrode electrically connected to the first internal electrode, and a second external electrode electrically connected to the second internal electrode, disposed on an outer surface of the ceramic body. The first external electrode is disposed on the first and second surfaces of the ceramic body, and the first external electrodes disposed on the first and second surfaces are connected to each other through a first via penetrating through, and disposed in, the ceramic body. The second external electrode is disposed on the first and second surfaces of the ceramic body, and the second external electrodes disposed on the first and second surfaces are connected to each other through a second via penetrating through, and disposed in, the ceramic body. Each of the first and second external electrodes includes a first electrode layer including a conductive metal and a plating layer disposed on the first electrode layer. The first electrode layer extends beyond the plating layer on the first surface of the ceramic body, and includes a first area covered by the plating layer, and a second area extending from the first area. An insulating layer covers the second area. $0.40 \leq L/BW \leq 4.00$, where L is a length of the insulating layer on the first surface in a width direction of the ceramic body, and BW is a distance from an outer edge of the first or second external electrode disposed on the first surface to an end of the respective first electrode layer on the first surface in the width direction of the ceramic body.

According to another aspect of the present disclosure, a multilayer ceramic electronic component includes: a ceramic body including a dielectric layer, and a first internal electrode and a second internal electrode facing each other with the dielectric layer interposed therebetween; and a first external electrode electrically connected to the first internal electrode, and a second external electrode electrically connected to the second internal electrode. The first external electrode is disposed on a first surface of the ceramic body and the second external electrode is disposed on a second surface of the ceramic body opposing the first surface. Each of the first and second external electrodes includes a first electrode layer including a conductive metal and a plating layer disposed on the first electrode layer, the first electrode layer extends beyond the plating layer on a third surface of the ceramic body, and comprises a first area covered by the plating layer, and a second area extending from the first area, an insulating layer covers the second area and is in direct contact with the ceramic body. The plating layer comprises a first plating layer disposed on the first electrode layer and including nickel (Ni), and a second plating layer disposed on the first plating layer and including tin (Sn), the second plating layer extends beyond the first plating layer and is in direct contact with the electrode layer, and $0.40 \leq L/BW \leq 4.00$, where L is a length of the insulating layer on the third surface in a width direction of the ceramic body, and BW is a distance from an outer edge of the first or second external electrode disposed on the third surface to an end of the respective first electrode layer on the third surface in the width direction of the ceramic body.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are same elements in the drawings.

Further, throughout the specification, it will be understood that when a portion "includes" an element, it can further include another element, not excluding another element, unless otherwise indicated.

In the drawings, certain elements may be omitted to clearly describe the present disclosure, and to clearly express a plurality of layers and areas, thicknesses may be magnified. The same elements having the same function within the scope of the same concept will be described with use of the same reference numeral.

Figure 1:
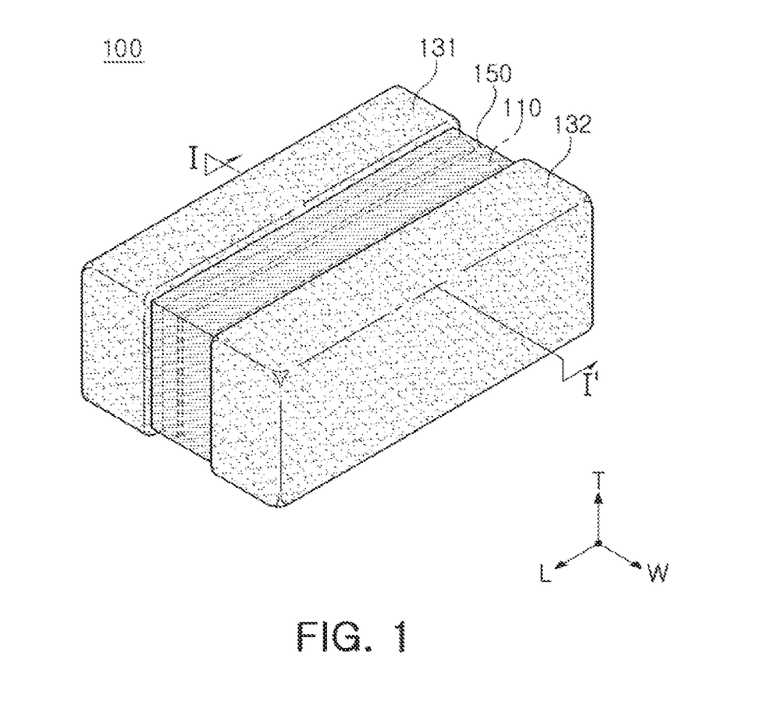
FIG. 1 is a perspective diagram illustrating a multilayer ceramic capacitor according to a first exemplary embodiment in the present disclosure.

FIG. 1 is a perspective diagram illustrating a multilayer ceramic capacitor according to a first exemplary embodiment in the present disclosure.

Figure 2:
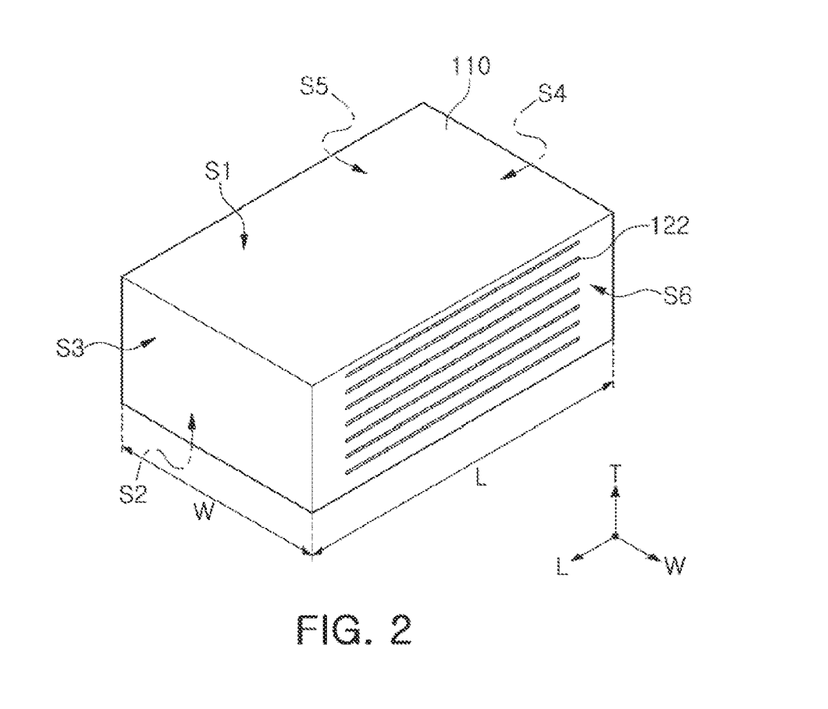
FIG. 2 is a diagram illustrating a ceramic body according to an exemplary embodiment in the present disclosure.

FIG. 2 is a diagram illustrating a ceramic body according to an exemplary embodiment in the present disclosure.

Figure 3:
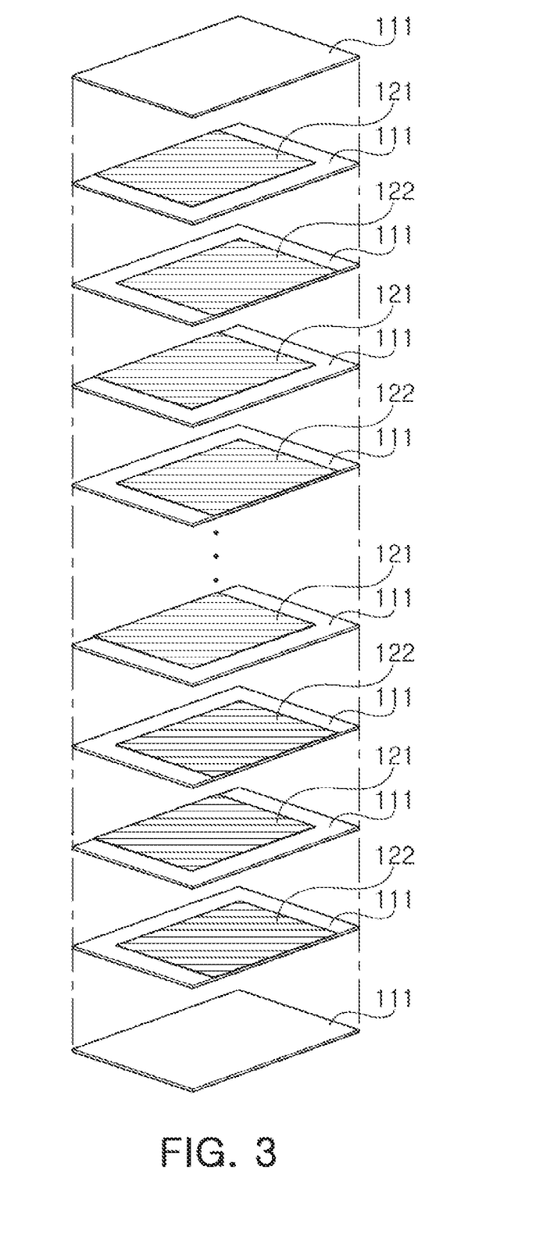
FIG. 3 is an exploded perspective diagram of FIG. 2.

FIG. 3 is an exploded perspective diagram of FIG. 2.

Figure 4:
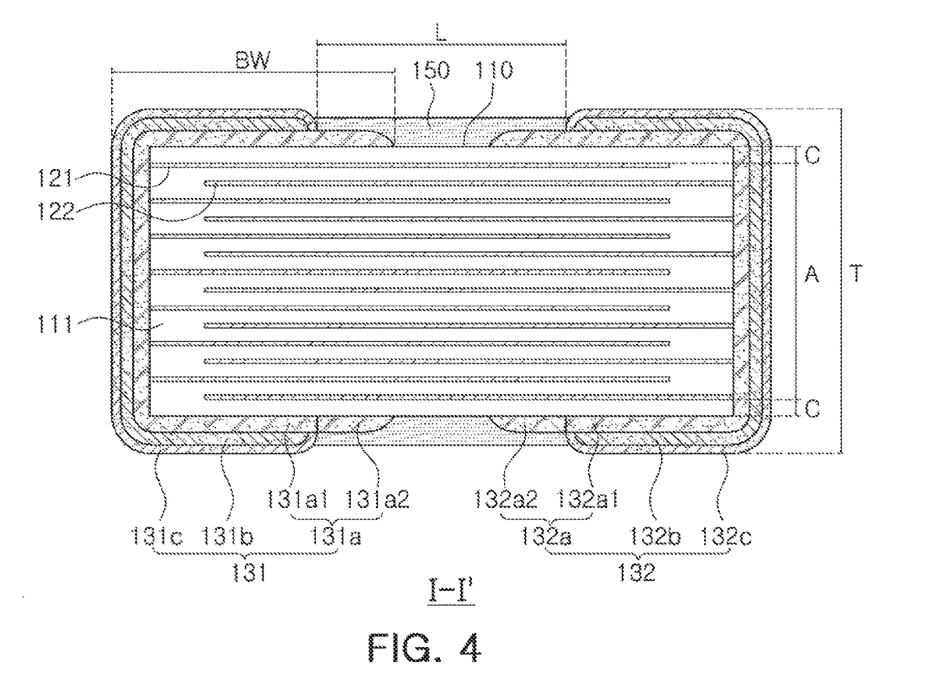
FIG. 4 is a cross-sectional diagram taken along line I-I' in FIG. 1.

FIG. 4 is a cross-sectional diagram taken along line I-I' in FIG. 1.

Referring to FIGS. 1 to 4, a multilayer ceramic electronic component 100 may include a ceramic body 110 including a dielectric layer 111, and a first internal electrode 121 and a second internal electrode 122 facing each other with the dielectric layer 111 interposed therebetween, and having first and second surfaces S1 and S2 opposing each other, third and fourth surfaces S3 and S4 connected to the first and second surfaces S1 and S2 and opposing each other, and fifth and sixth surfaces S5 and S6 connected to the first to fourth surfaces and opposing each other, and a first external electrode 131 electrically connected to the first internal electrode 121, and a second external electrode 132 electrically connected to the second internal electrode 122, disposed in an external portion of the ceramic body 110. The first and second external electrodes 131 and 132 may include first electrode layers 131a and 132a including a conductive metal, and plating layers 131b, 132b, 131c and 132c disposed on the first electrode layers 131a and 132a, respectively. The first electrode layers 131a and 132a may comprise first areas 131a1 and 132a1 in upper portions of which the plating layers 131b, 132b, 131c and 132c are disposed, and second areas 131a2 and 132a2 extended from the first areas 131a1 and 132a1. The first electrode layers 131a and 132a may have an insulating layer 150 covering the second areas 131a2 and 132a2.

In the description below, a multilayer ceramic electronic component according to an exemplary embodiment will be described, particularly a multilayer ceramic capacitor, but a multilayer ceramic electronic component is not limited thereto.

As for the multilayer ceramic capacitor according to an exemplary embodiment, a length direction may be defined as an "L" direction, a width direction may be defined as a "W" direction, and a thickness direction may be defined as a "T" direction. The thickness direction may be the same as a layering direction, a direction in which dielectric layers are layered.

In the exemplary embodiment, the ceramic body 110 may not be limited to any particular shape. As illustrated, the ceramic body 110 may have a hexagonal shape, for example.

The ceramic body 110 may have first and second surfaces S1 and S2 opposing each other, third and fourth surfaces S3 and S4 connecting to the first and second surfaces and opposing each other, and fifth and sixth surfaces S5 and S6 connected to the first to fourth surfaces and opposing each other.

The first and second surfaces S1 and S2 may face each other in a thickness direction of the ceramic body 110, the third and fourth surfaces S3 and S4 may face each other in a length direction, and the fifth and sixth surfaces S5 and S6 may face each other in a width direction.

One ends of the plurality of internal electrodes 121 and 122 disposed in the ceramic body 110 may be exposed to the fifth and sixth surfaces S5 and S6 of the ceramic body 110.

As for the internal electrodes 121 and 122, the first internal electrode 121 and the second internal electrode 122 having different polarities may be one pair.

One end of the first internal electrode 121 may be exposed to the fifth surface S5, and one end of the second internal electrode 122 may be exposed to the sixth surface S6.

The other ends of the first and second internal electrodes 121 and 122 may be formed from the sixth surface S6 or the fifth surface S5 with a certain gap therebetween. The configuration will be described in greater detail later.

The first and second external electrodes 131 and 132 may be formed on the fifth and sixth surfaces S5 and S6 of the ceramic body 110, and electrically connected to the internal electrodes.

According to the exemplary embodiment, a material of the dielectric layer 111 may not be limited to any particular material as long as sufficient capacitance can be obtained. For example, a material of the dielectric layer 111 may be a barium titanate (BaTiO$_3$) powder.

As the material of the dielectric layer 111, various ceramic additives, organic solvents, coupling agents, dispersing agents, and the like, may be added to a barium titanate (BaTiO3) powder, or the like, depending on an intended purpose.

The ceramic body 110 may have an active portion A, a portion contributing to form capacitance of the capacitor, and upper and lower cover portions C formed in upper and lower portions of the active portion A as upper and lower margin portions.

The active portion A may be formed by repeatedly layering a plurality of the first and second internal electrodes 121 and 122 with the dielectric layer 111 interposed therebetween.

The upper and lower cover portions C may have the same material and composition as those of the dielectric layer 111, but the upper and lower cover portions C may not include an internal electrode.

In other words, the upper and lower cover portions C may include a ceramic material, such as a barium titanate (BaTiO$_3$) ceramic material, for example.

The upper and lower cover portions C may be formed by disposing a single dielectric layer or layering two or more dielectric layers on upper and lower surfaces of the active portion A, and may prevent damage to an internal electrode caused by physical or chemical stress.

A material of the first and second internal electrodes 121 and 122 may not be limited to any particular material. The first and second internal electrodes 121 and 122 may be formed of a conductive paste including one or more of silver (Ag), lead (Pb), platinum (Pt), nickel (Ni), and copper (Cu).

The multilayer ceramic capacitor according to the exemplary embodiment may include the first external electrode 131 electrically connected to the first internal electrode 121 and the second external electrode 132 electrically connected to the second internal electrode 122.

The first and second external electrodes 131 and 132 may be electrically connected to the first and second internal electrodes 121 and 122 to form capacitance, and the second internal electrode 122 may be connected to a potential different from a potential of the first external electrode 131.

The first and second internal electrodes 121 and 122 may be disposed to oppose each other with the dielectric layer 111 interposed therebetween, and may be alternately exposed to the fifth and sixth surfaces S5 and S6 of the ceramic body 110 in a width direction.

As the first and second internal electrodes 121 and 122 are alternately exposed to the fifth and sixth surfaces S5 and S6 of the ceramic body 110 in a width direction, a reverse geometry capacitor (RGC) or a low inductance chip capacitor (LICC) may be implemented, which will be described later.

In a general multilayer ceramic electronic component, an external electrode may be disposed on surfaces opposing each other in a length direction of a ceramic body.

In this case, when an alternating current (AC) is applied to the external electrode, a large current loop may be formed as a current path is long, and an induced magnetic field may become large, which may lead to an increase in inductance.

To address the issue above, according to the exemplary embodiment, the first and second external electrodes 131 and 132 may be disposed on the fifth and sixth surfaces S5 and S6 of the ceramic body 110, opposing each other in a width direction, to reduce a current path.

In this case, as a gap between the first and second external electrodes 131 and 132 is small, a current path may be reduced, and a current loop may also be reduced, which may reduce inductance.

The first external electrode 131 may be disposed on the fifth and sixth surfaces S5 and S6 of the ceramic body 110 in width direction, and may be extended to the first and second surfaces S1 and S2 of the ceramic body 110 in a width direction.

According to the exemplary embodiment, the first and second external electrodes 131 and 132 disposed on the first and second surfaces S1 and S2 of the ceramic body 110 in a width direction may occupy areas 50% or greater of the first and second surfaces S1 and S2 of the ceramic body 110, respectively.

The first and second external electrodes 131 and 132 may include the first electrode layers 131a and 132a including a conductive metal, and the plating layers 131b, 132b, 131c and 132c disposed on the first electrode layers 131a and 132a, respectively. The first electrode layers 131a and 132a may comprise the first areas 131a1 and 132a1 in upper portions of which the plating layers 131b, 132b, 131c and 132c are disposed, and the second areas 131a2 and 132a2 extended from the first areas 131a1 and 132a1. The first electrode layers 131a and 132a may have the insulating layer 150 covering the second areas 131a2 and 132a2.

Referring to FIG. 4, the plating layers may have two layers, and the plating layers may include the first plating layers 131b and 132b including nickel (Ni) and the second plating layers 131c and 132c disposed on the first plating layers 131b and 132b and including tin (Sn). However, an exemplary embodiment thereof is not limited thereto.

The first electrode layer 131a and 132a may include a conductive metal and glass.

To form capacitance, the first and second external electrodes 131 and 132 may be formed on the fifth and sixth surfaces S5 and S6 of the ceramic body 110 in a width direction, respectively, and the first electrode layers 131a and 132a included in the first and second external electrodes 131 and 132 may be electrically connected to the first and second internal electrodes 121 and 122.

The first electrode layers 131a and 132a may be formed of the same conductive material as a material of the first and second internal electrodes 121 and 122, but a material of the first electrode layers 131a and 132a is not limited thereto. The material of the first electrode layers 131a and 132a may include one or more conductive metals selected from a group comprised of copper (Cu), silver (Ag), nickel (Ni), and alloys thereof, for example.

The first electrode layers 131a and 132a may be formed by applying a conductive paste made by adding glass frit to a powder of the conductive metal, and performing a sintering process.

In other words, the first electrode layers 131a and 132a may be a sintered electrode layer including a conductive metal and glass.

The plating layers including the first plating layer 131b and 132b including nickel (Ni) and the second plating layer 131c and 132c including nickel (Ni), disposed on the first plating layer 131b and 132b, may cover portions of the first electrode layer 131a and 132a.

In other words, according to the exemplary embodiment, first electrode layer 131a and 132a may comprise the first areas 131a1 and 132a1 in regions where the plating layers 131b, 132b, 131c and 132c are disposed, and the second areas 131a2 and 132a2 extend from the first areas 131a1 and 132a1.

The plating layer may not be disposed to cover the second areas 131a2 and 132a2 of the first electrode layer 131a and 132a.

As described above, if the plating layer is not disposed in the upper portions of the second areas 131a2 and 132a2 of the first electrode layer 131a and 132a, moisture resistance reliability may degrade. Thus, in the exemplary embodiment, the insulating layer 150 may be disposed to the second areas 131a2 and 132a2 of the first electrode layer 131a and 132a.

In a general capacitor, first and second external electrodes may be disposed closely to both ends of a ceramic body in a length direction, and a plating layer may be formed to cover an overall upper portion.

In the prior art as above, as a gap between the first and second external electrodes is significantly large, it may be difficult to obtain a low ESL value required in high frequency properties.

According to the exemplary embodiment, to obtain a low ESL value, the first and second external electrodes 131 and 132 may be disposed on the fifth and sixth surfaces S5 and S6 of the ceramic body 110, opposing each other in a width direction, and a gap between the first and second external electrodes 131 and 132 may be small. Accordingly, moisture resistance reliability may degrade, and short defects may occur between the first and second external electrodes 131 and 132.

To resolve the issue above, in the exemplary embodiment, the plating layers 131b, 132b, 131c and 132c may be disposed to cover portions of the first electrode layer 131a and 132a, and the insulating layer 150 may be disposed to cover the second areas 131a2 and 132a2 of the first electrode layer 131a and 132a on which the plating layer is not disposed.

In other words, the first electrode layer 131a and 132a may comprise the first areas 131a1 and 132a1 in regions where the plating layers 131b, 132b, 131c and 132c are disposed, and the second areas 131a2 and 132a2 extend from the first areas 131a1 and 132a1, areas in upper portions of which the plating layers 131b, 132b, 131c and 132c are not disposed.

As the upper portions of the second areas 131a2 and 132a2 may be exposed externally, the degradation of moisture resistance reliability and electrical short defects may occur. Thus, the insulating layer 150 may be disposed to cover the exposed portions.

According to the exemplary embodiment, the multilayer ceramic capacitor may have a thickness T of 110 μm or less.

Also, a ratio (L/BW) between a distance BW from an outer edge of the first or second external electrode 131 or 132 disposed on the first surface S1 to an end of the respective first electrode layer 131a or 132a on the first surface S1 in the width direction of the ceramic body 110 and a length L of the insulating layer 150 on the first surface S1 in a width direction of the ceramic body may satisfy the equation $0.40 \leq L/BW \leq 4.00$.

A multilayer ceramic capacitor having a low thickness, a thickness of 110 μm or less, has been increasingly used as a substrate having high mounting density has been developed.

In a multilayer ceramic capacitor having a low thickness, it may not be possible to increase a thickness of an external electrode further than a certain thickness within a limited thickness.

Accordingly, a thickness of an external electrode may be decreased, and moisture resistance reliability may be degraded.

Particularly, in the case of a low inductance chip capacitor (LICC) as in the exemplary embodiment, a gap between external electrodes may be reduced, and moisture resistance reliability may be further degraded.

To resolve the degradation of moisture resistance reliability of a low inductance chip capacitor (LICC) having a low thickness, a thickness of 110 μm or lower, and the degradation of reliability caused by a short between external electrodes, according to the exemplary embodiment, a ratio between a distance BW from an outer edge of the first or second external electrode 131 or 132 disposed on the first surface S1 to an end of the respective first electrode layer 131a or 132a on the first surface S1 in the width direction of the ceramic body 110 and a length L of the insulating layer 150 on the first surface S1 in a width direction of the ceramic body may be adjusted, thereby resolving the degradation of reliability of a multilayer ceramic capacitor having a low thickness, such as the degradation of moisture resistance reliability and short defects, and the like.

According to the exemplary embodiment, as a ratio (L/BW) between a distance BW from an outer edge of the first or second external electrode 131 or 132 disposed on the first surface S1 to an end of the respective first electrode layer 131a or 132a on the first surface S1 in the width direction of the ceramic body 110 and a length L of the insulating layer 150 on the first surface S1 in a width direction of the ceramic body is adjusted to satisfy the equation $0.40 \leq L/BW \leq 4.00$, and moisture resistance reliability of a multilayer ceramic capacitor having a low thickness may be improved, and short defects between external electrodes may be reduced.

Also, strength against breakage of a multilayer ceramic capacitor may also be improved by applying an insulating layer on an outer portion of the ceramic body 110.

According to the exemplary embodiment, to improve moisture resistance reliability of a multilayer ceramic capacitor having a low thickness, a thickness of 110 μm or less, and to reduce short defects between external electrodes, a desired ratio (L/BW) between a distance BW from an outer edge of the first or second external electrode 131 or 132 disposed on the first surface S1 to an end of the respective first electrode layer 131a or 132a on the first surface S1 in the width direction of the ceramic body 110 and a length L of the insulating layer 150 on the first surface S1 in a width direction of the ceramic body 110 may be derived within a limited width of the ceramic body.

According to the exemplary embodiment, a ratio (L/BW) between a distance BW from an outer edge of the first or second external electrode 131 or 132 disposed on the first surface S1 to an end of the respective first electrode layer 131a or 132a on the first surface S1 in a width direction of the ceramic body 110 and a length L of the insulating layer 150 on the first surface S1 in the width direction of the ceramic body 110 may be determined. In the case of a multilayer ceramic capacitor having a thickness of 110 μm or greater disclosed in the prior arts, the degradation of moisture resistance reliability or the short defects may not occur, and the ratio derived in the exemplary embodiment may not be applied to the multilayer ceramic capacitor.

When a ratio (L/BW) between a distance BW from an outer edge of the first or second external electrode 131 or 132 disposed on the first surface S1 to an end of the respective first electrode layer 131a or 132a on the first surface S1 in the width direction of the ceramic body 110 and a length L of the insulating layer 150 on the first surface S1 in a width direction of the ceramic body 110 is less than 0.40, a distance between external electrodes may be short, and the distance L between the both ends of the insulating layer may also be short, which may degrade moisture resistance reliability and cause short defects.

When a ratio (L/BW) between a distance BW from an outer edge of the first or second external electrode 131 or 132 disposed on the first surface S1 to an end of the respective first electrode layer 131a or 132a on the first surface S1 in the width direction of the ceramic body 110 and a length L of the insulating layer 150 on the first surface S1 in a width direction of the ceramic body 110 exceeds 4.0, moisture resistance reliability may degrade, and mounting defects may occur as an area of the external electrode in contact with an electrode pad is small when being mounted on a substrate.

Figure 5:
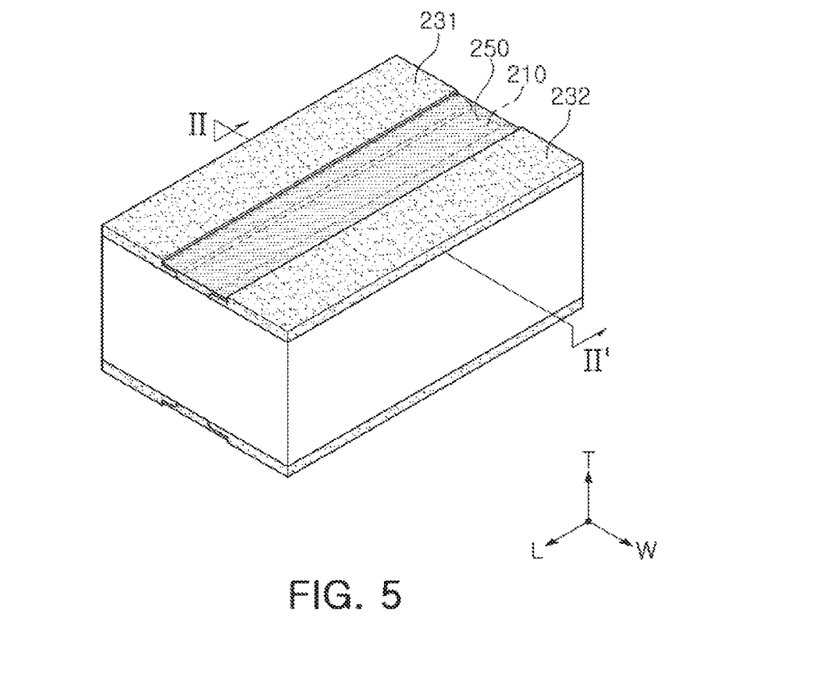
FIG. 5 is a perspective diagram illustrating a multilayer ceramic capacitor according to another exemplary embodiment in the present disclosure.

FIG. 5 is a perspective diagram illustrating a multilayer ceramic capacitor according to another exemplary embodiment.

Figure 6:
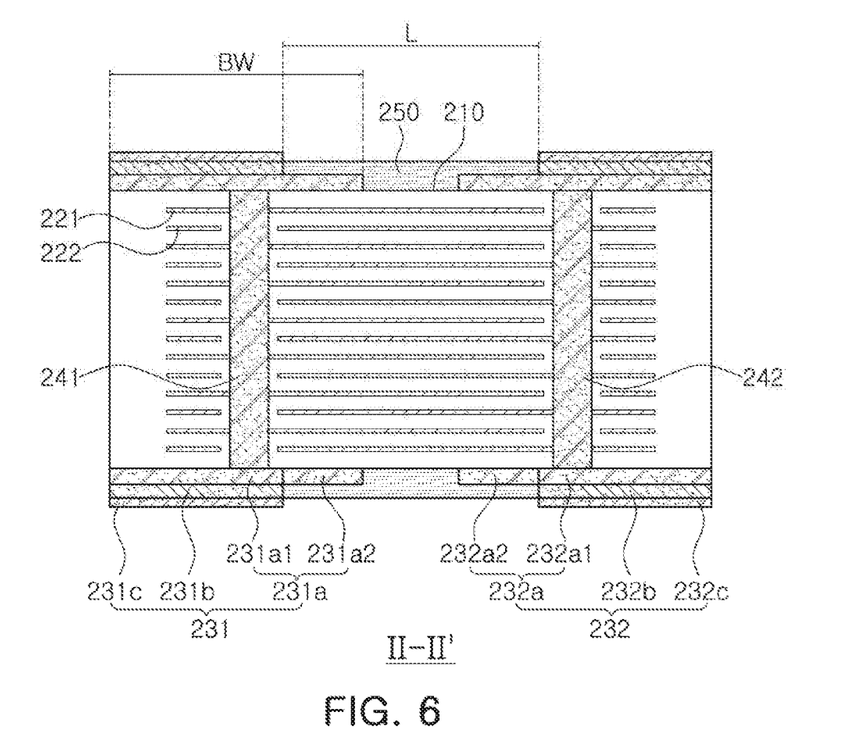
FIG. 6 is a cross-sectional diagram taken along line II-II' in FIG. 5.

FIG. 6 is a cross-sectional diagram taken along line II-II' of FIG. 5.

Referring to FIGS. 5 and 6, a multilayer ceramic electronic component 200 according to an exemplary embodiment may include a ceramic body 210 including a dielectric layer 211, and a first internal electrode 221 and a second internal electrode 222 facing each other with the dielectric layer 211 interposed therebetween, and having first and second surfaces S1 and S2 opposing each other, third and fourth surfaces S3 and S4 connected to the first and second surfaces S1 and S2 and opposing each other, and fifth and sixth surfaces S5 and S6 connected to the first to fourth surfaces and opposing each other, and a first external electrode 231 electrically connected to the first internal electrode 221, and a second external electrode 232 electrically connected to the second internal electrode 222, disposed in an external portion of the ceramic body 210. The first external electrode 231 may be disposed on the first and second surfaces S1 and S2 of the ceramic body 210, and the first external electrodes 231 disposed on the first and second surfaces S1 and S2 may be connected to each other through a first via 241 penetrating through, and disposed in, the ceramic body 210. The second external electrode 232 may be disposed on the first and second surfaces S1 and S2 of the ceramic body 210, and the second external electrodes 232 disposed on the first and second surfaces S1 and S2 may be connected to each other through a second via 242 penetrating through, and disposed in, the ceramic body 210. The first and second external electrodes 231 and 232 may include first electrode layers 231a and 232a including a conductive metal and plating layers 231b, 232b, 231c and 232c disposed on the first electrode layers 231a and 232a. The first electrode layers 231a and 232a may comprise first areas 231a1 and 232a1 in upper portions of which the plating layers 231b, 232b, 231c and 232c are disposed, and second areas 231a2 and 232a2 extended from the first areas 231a1 and 232a1. The first electrode layers 231a and 232a may have an insulating layer covering the second areas 231a2 and 232a2.

As compared to the multilayer ceramic capacitor according to the example embodiment described above, in the multilayer ceramic capacitor described in the exemplary embodiment described below, the first and second external electrodes 231 and 232 may be disposed on the first and second surfaces S1 and S2 of the ceramic body 210, respectively, and spaced part from each other. The first external electrodes 231 disposed on the first and second surfaces S1 and S2 may be connected to each other through the first via 241 penetrating through, and disposed in, the ceramic body 210, and the second external electrodes 232 disposed on the first and second surfaces may be connected to each other through the second via 242 penetrating through, and disposed in, the ceramic body 210.

The first external electrodes 231 may be disposed on the first and second surfaces S1 and S2 of the ceramic body 210.

The first external electrodes 231 disposed on the first and second surfaces S1 and S2 of the ceramic body 210 may be connected to each other through the first via 241 penetrating through, and disposed in, the ceramic body 210.

The second external electrodes 232 may be disposed on the first and second surfaces S1 and S2 of the ceramic body 110, and may be spaced apart from the first external electrode 231.

According to the exemplary embodiment, the first and second external electrodes 231 and 232 may be disposed on the first and second surfaces S1 and S2 of the ceramic body 210 in a length direction, and spaced part from each other. However, an exemplary embodiment thereof is not limited thereto. For example, the first and second external electrodes 231 and 232 may be formed up to boundaries between the first and second surfaces S1 and S2 and the third and fourth surfaces S3 and S4 of the ceramic body 210.

Also, the first and second external electrodes 231 and 232 may be disposed on the first and second surfaces S1 and S2 of the ceramic body 210, respectively, may be spaced apart from each other, and may face each other in a width direction.

The first via 241 may be connected to the first internal electrode 221, and may be insulated from the second internal electrode 222, and the second via 242 may be connected to the second internal electrode 222, and may be insulated from the first internal electrode 221.

The first external electrodes 231 disposed on the first and second surfaces S1 and S2 of the ceramic body 210 may be connected to each other through the first via 241 penetrating through, and disposed in, the ceramic body 210. As the first via 241 is connected to the first internal electrode 221, and insulated from the second internal electrode 222, the first external electrodes 231 may be electrically connected to the first internal electrode 221.

The second external electrodes 232 disposed on the first and second surfaces S1 and S2 of the ceramic body 210 may be connected to each other through the second via 242 penetrating through, and disposed in, the ceramic body 210. As the second via 242 is connected to the second internal electrode 222 and insulated from the first internal electrode 221, the second external electrode 232 may be electrically connected to the second internal electrode 222.

According to the exemplary embodiment, the first and second internal electrode 221 and 222 may not be exposed to a side surface of the ceramic body 210, and may be connected to the first and second external electrodes 231 and 232 through the first via 241 and the second via 242 penetrating through the ceramic body 210 in a thickness direction, respectively.

In the case of the multilayer ceramic capacitor according to the exemplary embodiment, as the first and second external electrodes 231 and 232 are disposed on the first and second surfaces S1 and S2 of the ceramic body 210, respectively, and spaced apart from each other and face each other in a width direction, a reverse geometry capacitor (RGC) or a low inductance chip capacitor (LICC) may be implemented.

The first via 241 and the second via 242 may be formed by forming holes in the ceramic body 210 and the first and second internal electrodes 221 and 222, and filling the holes with a conductive material. The conductive material may be applied by applying a conductive paste, or through a plating process, and the like. The holes in the ceramic body 210 may be formed by performing a laser (drilling?) process or a punching process on a ceramic green sheet, or may be obtained by forming a hole on a layering body after a sintering process.

In the multilayer ceramic capacitor 200 according to the exemplary embodiment, the first and second internal electrodes 221 and 222 may be connected to the first and second external electrodes 231 and 232 through the first and second vias 241 and 242, respectively, an area of overlap between the first and second internal electrodes 221 and 222 may be significantly increased.

Accordingly, without applying the method of increasing the number of internal electrode layers by reducing thicknesses of a dielectric layer and an internal electrode, and the like, it may be possible to increase capacitance of a capacitor. Also, as the same type of internal electrodes are electrically connected to each other through the first via 241 and the second via 242, even when a thickness of a multilayer ceramic capacitor is significantly low, a thickness of 110 µm or less, for example, connectivity of internal electrodes may be improved.

According to the exemplary embodiment, the first and second external electrodes 231 and 232 may include first electrode layers 231a and 232a, and plating layers disposed on the first electrode layers 231a and 232a, and the plating layers may include first plating layers 231b and 232b including nickel (Ni) and second plating layers 231c and 232c disposed on the first plating layers 231b and 232b and including tin (Sn).

Also, by adjusting a ratio (L/BW) between a distance BW from one ends of the first electrode layers 231a and 232a to the other ends on the first and second surfaces S1 and S2 of the ceramic body 210 and a distance L between both ends of the insulating layer 250 in a width direction of the ceramic body 210 to satisfy the equation $0.40 \leq L/BW \leq 4.00$, moisture resistance reliability of a multilayer ceramic capacitor having a low thickness, a thickness of 110 µm or less, may be improved, and short defects between external electrodes may be reduced.

Also, by applying an insulating layer to an outer portion of the ceramic body 210, strength against breakage of a multilayer ceramic capacitor may also be improved.

The descriptions of the multilayer ceramic capacitor described in the aforementioned exemplary embodiment will not be repeated.

In the description below, a method of manufacturing of a multilayer ceramic capacitor will be described in accordance with an exemplary embodiment. The method, however, is not limited thereto.

As for the method of manufacturing a multilayer ceramic capacitor according to the exemplary embodiment, a slurry formed including a powder such as barium titanate (BaTiO$_3$), and the like, may be applied on a carrier film and dried to form a plurality of ceramic green sheets, and a dielectric layer may be formed using the ceramic green sheets.

The ceramic green sheet may be a sheet having a certain thickness (µm), which may be manufactured using a slurry formed from a mixture of a ceramic powder, a binder, and a solvent, and by performing a doctor blade process on the slurry.

Then, a conductive paste for an internal electrode, having an average size of a nickel particle between 0.1 and 0.2 µm and including a nickel powder within a range from 40 to 50 part by weight, may be prepared.

An internal electrode may be formed by applying the conductive paste for an internal electrode on the green sheet using a printing process, the green sheets on which an internal electrode pattern is disposed may be layered, and the ceramic body 110 may be formed.

Thereafter, a first electrode layer including a conductive metal and glass may be formed on an outer portion of the ceramic body.

The conductive material may not be particularly limited. The conductive material may include, for example, one or more conductive metals selected from a group comprised of copper (Cu), silver (Ag), nickel (Ni), and alloys thereof.

In the exemplary embodiment, the first electrode layer may be formed using nickel (Ni) as the conductive metal.

The glass may not be particularly limited. The glass may have the same composition as that of the glass used for manufacturing an external electrode of a general multilayer ceramic capacitor.

The first electrode layer may be formed on upper and lower surfaces and ends of the ceramic body 110, and may be electrically connected to the first and second internal electrodes 121 and 122.

The first electrode layer may include 5% or higher of glass in volume, as compared to a first conductive metal.

Then, the first plating layer including nickel (Ni) may be formed on the first electrode layer.

Thereafter, the second electrode layer including tin (Sn) may be formed on the first plating layer.

Then, an insulating layer may be formed by applying an insulating material in an area in which the plating layer is not formed in upper portion of the first electrode layer, and in an upper portion of the ceramic body between the first electrode layers.

An insulating material of the insulating layer may not be limited to any particular material. The material may be one or more of an epoxy material, a ceramic material, a silicone material.

Table 1 below shows an examination on moisture resistance reliability and an examination on reliability of when a multilayer ceramic capacitor is mounted on a printed circuit board in accordance with a ratio (L/BW) between a distance BW from an outer edge of the first or second external electrode 231 or 232 disposed on the first surface to an end of the respective first electrode layer 231a or 232a on the first surface in the width direction of the ceramic body 210 and a length L of the insulating layer 250 on the first surface S1 in a width direction of the ceramic body 210.

In the examination on moisture resistance reliability and the examination on reliability of when a multilayer ceramic capacitor is mounted on a printed circuit board, a sample in which reliability was degraded was marked "X," and the sample was selected as an comparative example. A sample in which reliability was not degraded was marked "O," and the sample was selected as a comparative example.

TABLE 1

| Sample | BW [µM] | L [µM] | L/BW | Examination on moisture resistance reliability | Examination on reliability of when mounted |
|---|---|---|---|---|---|
| *1 | 50 | 300 | 6.00 | X | X |
| *2 | 50 | 400 | 8.00 | X | X |
| *3 | 100 | 300 | 3.00 | X | X |
| *4 | 100 | 500 | 5.00 | O | X |

TABLE 1-continued

| Sample | BW [μM] | L [μM] | L/BW | Examination on moisture resistance reliability | Examination on reliability of when mounted |
|---|---|---|---|---|---|
| 5 | 150 | 400 | 2.67 | ○ | ○ |
| 6 | 200 | 300 | 1.50 | ○ | ○ |
| 7 | 200 | 400 | 2.00 | ○ | ○ |
| 8 | 250 | 200 | 0.80 | ○ | ○ |
| *9 | 250 | 80 | 0.32 | X | X |
| *10 | 280 | 100 | 0.36 | ○ | X |

*Comparative example

In table 1 above, in samples 1 to 4, a ratio (L/BW) between a distance BW from an outer edge of the first or second external electrode 131 or 132 disposed on the first surface S1 to an end of the respective first electrode layer 131a or 132a on the first surface S1 in the width direction of the ceramic body 110 and a length L of the insulating layer 150 on the first surface S1 in a width direction of the ceramic body 110 exceeded 4.00, and moisture resistance reliability was degraded, and mounting defects occurred as an area of external electrode in contact with an electrode pad was small when the capacitor is mounted on a substrate.

In samples 5 to 8, a ratio (L/BW) between a distance BW from an outer edge of the first or second external electrode 131 or 132 disposed on the first surface S1 to an end of the respective first electrode layer 131a or 132a on the first surface S1 in the width direction of the ceramic body 110 and a length L of the insulating layer 150 on the first surface S1 in a width direction of the ceramic body 110 satisfied the equation $0.40 \leq L/BW \leq 4.00$ as in the exemplary embodiment described above, and strength against breakage of a multilayer ceramic capacitor having a low thickness, a thickness of 110 μm or less, was increased, which may prevent the degradation of reliability caused by breakage and cracks during processes.

In samples 9 and 10, a ratio (L/BW) between a distance BW from an outer edge of the first or second external electrode 131 or 132 disposed on the first surface S1 to an end of the respective first electrode layer 131a or 132a on the first surface S1 in the width direction of the ceramic body 110 and a length L of the insulating layer 150 on the first surface S1 in a width direction of the ceramic body 110 was less than 0.40, and a distance between the external electrodes was short, and the distance L between both ends of the insulating layer 150 was also short, which may cause the degradation of moisture resistance reliability and shorts between the external electrodes.

According to the aforementioned exemplary embodiments, by adjusting a ratio between a width BW of an area on the first and second surfaces of the ceramic body on the first electrode layer, a sintered layer, and a length L between both ends of the insulating layer in a width direction of the ceramic body, moisture resistance reliability of a multilayer ceramic capacitor having a low thickness may be improved, and short defects between external electrodes may be prevented.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including a dielectric layer, and a first internal electrode and a second internal electrode facing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other; and a first external electrode electrically connected to the first internal electrode, and a second external electrode electrically connected to the second internal electrode, disposed on an outer surface of the ceramic body, wherein each of the first and second external electrodes comprises a first electrode layer including a conductive metal and a plating layer disposed on the first electrode layer, wherein the first electrode layer extends beyond the plating layer on the first surface of the ceramic body, and comprises a first area covered by the plating layer, and a second area extending from the first area, wherein an insulating layer covers the second area, and wherein $0.40 \leq L/BW \leq 4.00$, where L is a length of the insulating layer on the first surface in a width direction of the ceramic body, and BW is a distance from an outer edge of the first or second external electrode disposed on the first surface to an end of the respective first electrode layer on the first surface in the width direction of the ceramic body.

2. The multilayer ceramic electronic component of claim 1, wherein the plating layer comprises a first plating layer disposed on the first electrode layer and including nickel (Ni), and a second plating layer disposed on the first plating layer and including tin (Sn).

3. The multilayer ceramic electronic component of claim 1, wherein the first electrode layer is a sintered electrode layer including glass and at least one conductive metal selected from a group comprising copper (Cu), silver (Ag), nickel (Ni), and alloys thereof.

4. The multilayer ceramic electronic component of claim 1, wherein the multilayer ceramic electronic component has a thickness of 110 μm or less.

5. The multilayer ceramic electronic component of claim 1, wherein a length of the ceramic body is a distance between the third and fourth surfaces, a width of the ceramic body is a distance between the fifth and sixth surfaces, and the first internal electrode and the second internal electrode are alternately exposed to the fifth and sixth surfaces.

6. The multilayer ceramic electronic component of claim 1, wherein the first and second external electrodes are disposed on the fifth and sixth surfaces of the ceramic body, respectively, and extend to the first and second surfaces.

7. The multilayer ceramic electronic component of claim 6, wherein the first and second external electrodes disposed on the first and second surfaces of the ceramic body occupy areas 50% or greater of the first and second surfaces of the ceramic body, respectively.

8. A multilayer ceramic electronic component comprising:
a ceramic body including a dielectric layer, and a first internal electrode and a second internal electrode facing each other with the dielectric layer interposed therebetween, and having first and second surfaces opposing each other, third and fourth surfaces connected to the first and second surfaces and opposing each other, and fifth and sixth surfaces connected to the first to fourth surfaces and opposing each other; and a first external electrode electrically connected to the first internal electrode, and a second external electrode electrically connected to the second internal electrode, disposed on an outer surface of the ceramic body, wherein the first external electrode is disposed on the first and second surfaces of the ceramic body, and the first external electrodes disposed on the first and second surfaces are connected to each other through a first via penetrating through, and disposed in, the ceramic body, wherein the second external electrode is disposed on the first and second surfaces of the ceramic body, and the second external electrodes disposed on the first and second surfaces are connected to each other through a second via penetrating through, and disposed in, the ceramic body, wherein each of the first and second external electrodes comprises a first electrode layer including a conductive metal and a plating layer disposed on the first electrode layer, wherein the first electrode layer extends beyond the plating layer on the first surface of the ceramic body, and comprises a first area covered by the plating layer, and a second area extending from the first area, wherein an insulating layer covering the second area, and wherein $0.40 \leq L/BW \leq 4.00$, where L is a length of the insulating layer on the first surface in a width direction of the ceramic body, and BW is a distance from an outer edge of the first or second external electrode disposed on the first surface to an end of the respective first electrode layer on the first surface in the width direction of the ceramic body.

9. The multilayer ceramic electronic component of claim 8, wherein the first electrode layer is a sintered electrode layer including glass and at least one conductive metal selected from a group comprising copper (Cu), silver (Ag), nickel (Ni), and alloys thereof.

10. The multilayer ceramic electronic component of claim 8, wherein the multilayer ceramic electronic component has a thickness of 110 µm or less.

11. The multilayer ceramic electronic component of claim 8, wherein a length of the ceramic body is a distance between the third and fourth surfaces, a width of the ceramic body is a distance between the fifth and sixth surfaces, and the first internal electrode and the second internal electrode are alternately exposed to the fifth and sixth surfaces.

12. The multilayer ceramic electronic component of claim 8, wherein the plating layer comprises a first plating layer disposed on the first electrode layer and including nickel (Ni), and a second plating layer disposed on the first plating layer and including tin (Sn).

13. The multilayer ceramic electronic component of claim 8, wherein the first and second external electrodes are spaced apart from each other.

14. The multilayer ceramic electronic component of claim 8, wherein the first and second external electrodes are spaced apart from each other in a width direction of the ceramic body.

15. The multilayer ceramic electronic component of claim 8, wherein the first via is connected to the first internal electrode and is insulated from the second internal electrode, and the second via is connected to the second internal electrode and is insulated from the first internal electrode.

16. The multilayer ceramic electronic component of claim 8, wherein the first and second external electrodes disposed on the first and second surfaces of the ceramic body occupy areas 50% or greater of the first and second surfaces of the ceramic body, respectively.

17. A multilayer ceramic electronic component comprising:
a ceramic body including a dielectric layer, and a first internal electrode and a second internal electrode facing each other with the dielectric layer interposed therebetween; and
a first external electrode electrically connected to the first internal electrode, and a second external electrode electrically connected to the second internal electrode,
wherein the first external electrode is disposed on a first surface of the ceramic body and the second external electrode is disposed on a second surface of the ceramic body opposing the first surface,
wherein each of the first and second external electrodes includes a first electrode layer including a conductive metal and a plating layer disposed on the first electrode layer,
the first electrode layer extends beyond the plating layer on a third surface of the ceramic body, and comprises a first area covered by the plating layer, and a second area extending from the first area,
an insulating layer covers the second area and is indirect contact with the ceramic body,
the plating layer comprises a first plating layer disposed on the first electrode layer and including nickel (Ni), and a second plating layer disposed on the first plating layer and including tin (Sn),
the second plating layer extends beyond the first plating layer and is in direct contact with the electrode layer, and $0.40 \leq L/BW \leq 4.00$, where L is a length of the insulating layer on the third surface in a width direction of the ceramic body, and BW is a distance from an outer edge of the first or second external electrode disposed on the third surface to an end of the respective first electrode layer on the third surface in the width direction of the ceramic body.

18. The multilayer ceramic electronic component of claim 17, wherein the first and second surfaces are surfaces of the ceramic body in a width direction.

19. The multilayer ceramic electronic component of claim 17, wherein the insulating layer includes at least one selected from the group consisting of an epoxy material, a ceramic material and a silicone material.

20. The multilayer ceramic electronic component of claim 17, wherein the first electrode layer extends beyond the plating layer on a fourth surface of the ceramic body opposing the third surface of the ceramic body, and comprises a first area covered by the plating layer, and a second area extending from the first area,
an insulating layer covers the second area and is indirect contact with the ceramic body, and
$0.40 \leq L/BW \leq 4.00$, where L is a length of the insulating layer on the fourth surface in a width direction of the ceramic body, and BW is a distance from an outer edge of the first or second external electrode disposed on the fourth surface to an end of the respective first electrode layer on the third surface in the width direction of the ceramic body.

* * * * *

UNITED STATES PATENT AND TRADEMARK OFFICE
CERTIFICATE OF CORRECTION

PATENT NO. : 10,361,035 B1
APPLICATION NO. : 16/202051
DATED : July 23, 2019
INVENTOR(S) : Seung Woo Song et al.

Page 1 of 1

It is certified that error appears in the above-identified patent and that said Letters Patent is hereby corrected as shown below:

On the Title Page

Item (30) Foreign Application Priority Data please change to reflect the correct Priority Number as follows:
-- (30) Foreign Priority Application Data
Oct. 2, 2018 (KR) .................... 10-2018-0117769 --

Signed and Sealed this
Seventeenth Day of September, 2019

Andrei Iancu
*Director of the United States Patent and Trademark Office*